(12) United States Patent
Srinivasan et al.

(10) Patent No.: US 10,919,119 B2
(45) Date of Patent: Feb. 16, 2021

(54) METHOD FOR REPAIRING A COMPONENT BY ADDITIVE MANUFACTURING

(71) Applicant: General Electric Company, Schenectady, NY (US)

(72) Inventors: Dheepa Srinivasan, Bangalore (IN); Joydeep Pal, Bangalore (IN); Debabrata Mukhopadhyay, Bangalore (IN)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 16/042,355

(22) Filed: Jul. 23, 2018

(65) Prior Publication Data
US 2019/0022803 A1 Jan. 24, 2019

(30) Foreign Application Priority Data
Jul. 24, 2017 (IN) .............................. 201741026147

(51) Int. Cl.
*B23P 6/00* (2006.01)
*B33Y 10/00* (2015.01)
(Continued)

(52) U.S. Cl.
CPC ............ *B23P 6/007* (2013.01); *B22F 3/1055* (2013.01); *B22F 5/009* (2013.01); *B22F 5/04* (2013.01);
(Continued)

(58) Field of Classification Search
CPC .. B23P 6/007; B22F 5/009; B22F 5/04; B22F 3/1055; B22F 7/062; B22F 2007/068;
(Continued)

(56) References Cited

U.S. PATENT DOCUMENTS 6,128,820 A * 10/2000 Nolan .................. B23K 9/0026
29/889.1
6,376,801 B1 * 4/2002 Farrell ................. B23K 9/1274
219/124.34
(Continued)

FOREIGN PATENT DOCUMENTS

DE 10 2012 013 949 A1 1/2014
EP 2 495 397 A2 9/2012
(Continued)

OTHER PUBLICATIONS

Extended European Search Report and Opinion issued in connection with corresponding EP Application No. 18184878.9 dated Nov. 7, 2018.
(Continued)

*Primary Examiner* — Moshe Wilensky
(74) *Attorney, Agent, or Firm* — James Pemrick; Hoffman Warnick LLC (57) ABSTRACT

A method for repairing a component is disclosed. The method includes removing a portion originally including a plurality of cooling holes, of the component to form a cavity, forming by additive manufacturing a replacement portion including a plurality of cooling holes, and varying a surface roughness and a diameter of at least one cooling hole of the plurality of cooling holes during the forming by additive manufacturing the replacement portion. The replacement portion replaces the portion of the component.

13 Claims, 2 Drawing Sheets

(51) Int. Cl.
    *F01D 5/00*     (2006.01)
    *B23K 26/342*     (2014.01)
    *B22F 3/105*     (2006.01)
    *B22F 5/00*     (2006.01)
    *B22F 5/04*     (2006.01)
    *C22C 1/04*     (2006.01)
    *C22C 33/02*     (2006.01)
    *B22F 7/06*     (2006.01)

(52) U.S. Cl.
    CPC ............ *B23K 26/342* (2015.10); *B33Y 10/00* (2014.12); *C22C 1/0433* (2013.01); *C22C 33/02* (2013.01); *F01D 5/005* (2013.01); *B22F 2003/1056* (2013.01); *B22F 2007/068* (2013.01); *F05D 2230/80* (2013.01); *F05D 2300/10* (2013.01)

(58) Field of Classification Search
    CPC ........... B22F 2003/1056; C22C 1/0433; C22C 33/02; B33Y 10/00; F01D 5/005; B23K 26/342; F05D 2300/10; F05D 2230/80
    See application file for complete search history.

(56) References Cited

U.S. PATENT DOCUMENTS

| | | | |
|---|---|---|---|
| 8,039,773 B2* | 10/2011 | Spallek | G02B 23/2469 |
| | | | 219/121.63 |
| 8,247,733 B2* | 8/2012 | Zhu | B23K 26/1482 |
| | | | 219/121.63 |
| 9,393,620 B2* | 7/2016 | Bales | B33Y 10/00 |
| 9,522,426 B2* | 12/2016 | Das | C30B 19/08 |
| 2015/0033559 A1 | 2/2015 | Bruck et al. | |
| 2016/0245519 A1 | 8/2016 | Burd | |

FOREIGN PATENT DOCUMENTS

| | | |
|---|---|---|
| EP | 2 777 867 A1 | 9/2014 |
| EP | 2 942 424 A2 | 11/2015 |
| EP | 3 115 147 A1 | 1/2017 |
| WO | 2008/046387 A1 | 4/2008 |

OTHER PUBLICATIONS

India Examination Report issued in connection with corresponding IN Application No. 201741026147 dated Dec. 17, 2019, 4 pages.

* cited by examiner

METHOD FOR REPAIRING A COMPONENT BY ADDITIVE MANUFACTURING

BACKGROUND OF THE INVENTION

The present disclosure is directed to a method for repairing a component by additive manufacturing. More particularly, the present disclosure is directed to a method for repairing a component, for example a turbine component using additive manufacturing for enhanced cooling capabilities.

Gas turbines components such as buckets (blades), nozzles (vanes), combustors, shrouds, and other hot gas path components are typically exposed to extreme temperatures, chemical environments, and physical conditions during operation of the gas turbines. Over time, continued exposure to high temperatures during operation may induce thermal gradients and stresses in the components, which may damage and thus adversely affect the operation of the gas turbines. Therefore, these components are generally serviced at various points throughout their life cycle. Often, due to the operating conditions within the gas turbines, the servicing of the components includes repairing, removing and/or replacing a portion of the component. Servicing of the components using conventional processes includes forging, casting, machining, which may be costly, time-consuming and increase down time for the gas turbines during servicing. Additive processes such as Direct Metal Laser Melting (DMLM), Direct Metal Laser Sintering (DMLS), Selective Laser Sintering (SLS), Electron Beam Melting (EBM) are potential processes that may offer significant cost and time reduction in manufacturing and/or repairing components with complex geometries.

Furthermore, internal cooling of components, for example, combustor liners and turbine blades (buckets) and vanes (nozzles) of the gas turbines, is commonly employed to reduce their service temperatures, which allows the gas turbines to operate more efficiently at high temperatures. As operational efficiencies of the gas turbines can be achieved by higher firing temperatures and with enhanced aerodynamic design of the airfoils, for example, the nozzle airfoils, advanced turbines have adopted improved internal cooling configurations particularly for the trailing edges of the airfoils.

An internally-cooled component for example, an air-cooled component of a gas turbine typically requires that the cooling air flow is routed through a cooling circuit within the component before being discharged through carefully configured cooling holes (or slots) that distribute a cooling film over a surface of the component to increase the effectiveness of the cooling flow. The size, shape and surface conditions of the cooling holes may contribute in determining the amount of air flow (i.e., flow rate) exiting the cooling holes. The flow rate of air within the cooling holes affects the overall flow distribution within the cooling holes and heat transfer between the cooling air and the internal surfaces of the cooling holes. The cooling may be highest when the heat transfer is maximum. Accordingly, the internal surfaces of the cooling holes may be designed to enable a longer duration of contact and an increased effective area for the heat transfer enhancement between the cooling air and the internal surfaces of the cooling holes. However, processes by which cooling holes are formed and configured, may limit the cooling because it has been challenging to achieve desired surface conditions or properties within intricate cooling holes.

BRIEF DESCRIPTION

In one embodiment, a method for repairing a component is described. The method includes removing a portion originally including a plurality of cooling holes, of the component to form a cavity, forming by additive manufacturing a replacement portion including a plurality of cooling holes, and varying a surface roughness and a diameter of at least one cooling hole of the plurality of cooling holes during the forming by additive manufacturing the replacement portion. The replacement portion replaces the portion of the component.

In one embodiment, a method for repairing a component is described. The method includes removing a damaged portion originally including a plurality of cooling holes of the component to form a cavity, forming by additive manufacturing a replacement portion including a plurality of cooling holes in the cavity, and varying a surface roughness and a diameter of at least one cooling hole of the plurality of cooling holes during the forming by additive manufacturing the replacement portion. The replacement portion replaces the damaged portion of the component.

These and other features, embodiments, and advantages of the present disclosure may be understood more readily by reference to the following detailed description, taken in conjunction with the accompanying drawings which illustrate, by way of example, the aspects of the present disclosure.

BRIEF DESCRIPTION OF THE DRAWINGS

These and other features and aspects of embodiments of the present disclosure will become better understood when the following detailed description is read with reference to the accompanying drawings in which like characters in each individual figure represent like parts throughout the drawings, wherein.

DETAILED DESCRIPTION

Provided herein are methods for repairing components by additive manufacturing. In particular, embodiments of the present disclosure provide methods for repairing components, for example turbine components having cooling holes, by additive manufacturing for achieving improved cooling. By improving cooling of a turbine component, the turbine component may be used at an enhanced temperature, and may improve overall efficiency. In addition, embodiments of the present disclosure, in comparison to processes and articles not using one or more of the features described herein, decrease scrapping of used components, increase component life, permit replacing larger portions of a component, decrease or eliminate welding during the forming of the component, decrease system down time, increase efficiency of component formation, decrease or eliminate formation of heat affected zones, decrease cost of component formation, decrease or eliminate post-formation processing of the component, permit modification of component composition, decrease or eliminate distortion of the component, increase reliability of component formation, or a combination thereof.

In the following specification and the claims, singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

If ranges are disclosed, the endpoints of all ranges directed to the same component or property are inclusive and independently combinable (e.g., ranges of "from about 5 microns to about 10 microns" is inclusive of the endpoints and all intermediate values of the ranges of "about 5 microns to about 10 microns," etc.). Accordingly, here and throughout the specification and claims, range limitations may be combined and/or interchanged, such ranges are identified and include all the sub-ranges contained therein unless context or language indicates otherwise. The term "about" is used in connection with a quantity that is inclusive of the stated value and has the meaning dictated by the context (e.g., includes the degree of error associated with measurement of the particular quantity). Accordingly, a value modified by the term "about" is not necessarily limited only to the precise value specified.

As used herein, the term "surface roughness" refers to a configuration for example, a coarseness or unevenness of a surface of an object, due to, for example, projections, bumps, irregularities, waviness or breaks. A degree of surface roughness can be used to indicate the configuration of the surface of the object. Surface roughness can be represented as Ra and RMS, each is calculated differently. Ra (roughness average) is the arithmetic average of the absolute values of the roughness profile ordinates i.e., surface waviness and/or irregularities. RMS is calculated as the Root Mean Square of the absolute values of the roughness profile ordinates i.e., surface waviness and/or irregularities.

In some embodiments, a method for repairing a component is described. In some embodiments, the method for repairing the component is performed by additive manufacturing. The method includes removing a portion originally including a plurality of cooling holes, of the component to form a cavity, forming by additive manufacturing a replacement portion including a plurality of cooling holes, and varying a surface roughness and a diameter of at least one cooling hole of the plurality of cooling holes during the forming by additive manufacturing the replacement portion. The replacement portion replaces the portion (i.e., removed portion) of the component. In some embodiments, the portion includes a damaged portion of the component. The method may include directly forming the replacement portion in the cavity or separately forming the replacement portion followed by securing the replacement portion within the cavity to form a repaired component. In some embodiments, the method includes in-situ forming by additive manufacturing the replacement portion in the cavity.

As used herein, the term "in-situ forming by additive manufacturing" refers to directly disposing a material on a component while forming by additive manufacturing a portion of the component.

The component to be repaired includes any suitable component for having the replacement portion formed thereto. The component may include a turbine component. The turbine component may be a hot gas path component. Suitable examples include, but are not limited to, a nozzle, a blade, a bucket, a vane, a shroud, a combustor, any other hot gas path component, or a combination thereof. In certain embodiments, the component may include a nozzle of a gas turbine. In some embodiments, the replacement portion includes a trailing edge portion of the nozzle.

Figure 1:
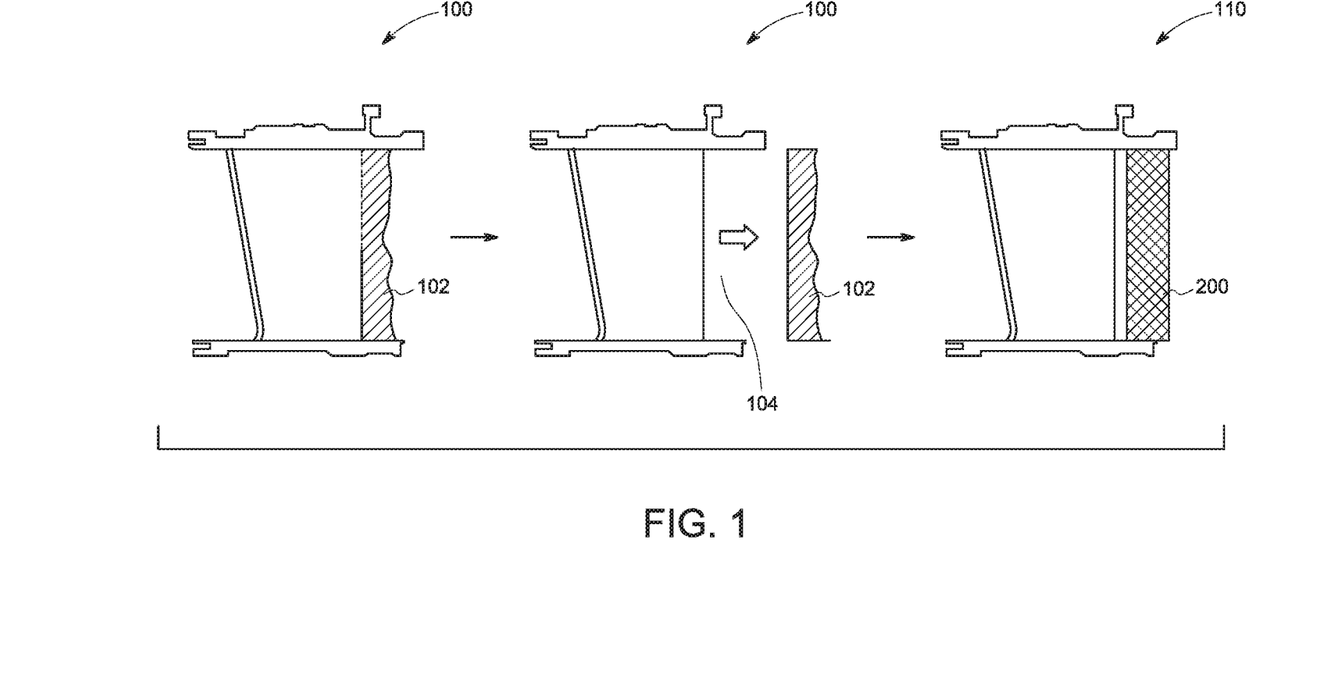
FIG. 1 shows schematic representation of the steps for repairing a component, in accordance with one embodiment of the present disclosure.

FIG. 1, in one embodiment, schematically represents a method for repairing a component 100, for example a nozzle of a gas turbine. The component 100 may also be referred to as an original component, and these terms may be used interchangeably throughout the specification. The method includes removing a portion 102 of the component 100 to form a cavity 104 in the component 100 and forming by additive manufacturing a replacement portion 200 that replaces the portion 102 of the component 100. In some embodiments, the portion 102 may be a damaged portion of the component 100. After removing the portion 102, in some embodiments, the method for repairing the component 100 includes forming by additive manufacturing the replacement portion 200 followed by securing the replacement portion 200 in the cavity 104. In some embodiments, the method for repairing the component 100 includes in-situ forming by additive manufacturing the replacement portion 200 onto the component 100 after removing the portion 102 to fill the cavity 104 without any post-securing processing. The method thereby forms a repaired component 110.

In some embodiments, the portion 102 includes a trailing edge portion of the nozzle of a gas turbine. The portion 102, in some embodiments, originally includes a plurality of cooling holes (not shown in FIG. 1 for the ease of illustration). The originally presented plurality of cooling holes of the portion 102 may have a diameter in a range of from about 0.2 millimeters (mm) to about 5 mm. In some embodiments, the originally presented plurality of cooling holes of the portion 102 has a diameter in a range of from about 0.5 mm to about 3 mm. Furthermore, the originally presented plurality of cooling holes of the portion 102 may have a surface roughness in a range of from about 0.05 micron ($\mu$m) Ra to 1 $\mu$m Ra. The surface properties such as surface roughness of the originally presented plurality of cooling holes of the portion 102 might be dependent on the manufacturing process, for example casting that was used to form the component 100 or the portion 102 of the component 100.

The replacement portion 200 may include any desirable shape and/or geometry configured to fill the cavity 104 in the component 100 to thereby form the repaired component 110. In some embodiments, the replacement portion 200 has a shape and geometry substantially same to the cavity 104. In some embodiments, the replacement portion 200 has a shape and geometry substantially same to the portion 102. As used herein, the term "substantially same" means that the replacement portion 200 may deviate in shape and geometry of the cavity 104 or the portion 102 by less than 5 percent. In some embodiments, the replacement portion 200 may deviate in shape and geometry of the cavity 104 or the portion 102 by less than 2 percent, and in certain embodiment, less than 1 percent.

Figure 2:
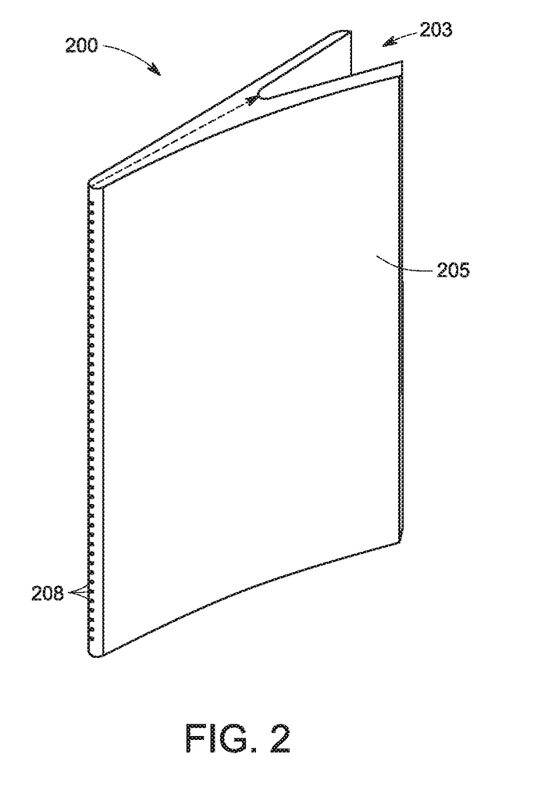
FIG. 2 is a perspective view of a replacement portion, in accordance with one embodiment of the present disclosure.

In some embodiments, the replacement portion 200 includes a trailing edge portion of a nozzle of a gas turbine, as shown in FIG. 2. As illustrated in FIG. 2, the replacement portion 200 includes a segment of an internal cavity 203, a shaped outer surface 205, and a plurality of cooling holes 208 formed therein. The trailing edge portion may replace the portion 102 of the component 100, for example a nozzle to form a repaired nozzle. In some embodiments, the trailing edge portion may be formed and secured within the cavity 104 of the component 100 to form the repaired nozzle. In some embodiments, the forming the trailing edge portion includes in-situ forming the trailing edge portion in the cavity 104 to form the repaired nozzle without any post-securing processing.

As noted, the replacement portion 200 is formed by additive manufacturing. Generally, additive manufacturing processes or techniques form net or near-net shape structures through sequentially and repeatedly depositing and joining material layers. As used herein "near-net shape" means that an article, for example the replacement portion 200 (FIG. 1) is formed very close to the final desired shape of the replacement portion 200 that may not require significant traditional mechanical finishing techniques such as machining or grinding, and/or post-processing treatment following the additive manufacturing. As used herein "net shape" means that an article is formed with the final shape of the article, not requiring any traditional mechanical finishing techniques such as machining or grinding, and/or post-processing treatment following the additive manufacturing. Examples of additive manufacturing processes include, but are not limited to, Direct Metal Laser Melting (DMLM), Direct Metal Laser Sintering (DMLS), Direct Metal Laser Deposition (DMLD), Laser Engineered Net Shaping (LENS), Selective Laser Sintering (SLS), Selective Laser Melting (SLM), Electron Beam Melting (EBM), Fused Deposition Modeling (FDM), or a combination thereof. In some embodiments, the method for repairing the component 100 includes forming the replacement portion 200 by DMLM process.

In one embodiment, the DMLM process for forming the replacement portion 200 includes distributing a plurality of layers of a powder material in a predetermined manner and melting the powder material to form the plurality of layers and to join the plurality of layers, and thereby forming the replacement portion 200 of a desired shape and geometry to fill the cavity 104 of the component 100. The process details for forming an article by DMLM process are described in previous Patent Application No. PCT/PL2016/050020 filed on May 18, 2016. In some embodiments, the DMLM process is performed with a powder deposition assembly as described in previous Patent Application No. PCT/PL2016/050020.

In some embodiments, the step of melting the powder material includes selectively melting the powder material for example, by a focused energy source. Suitable focused energy sources for the DMLM process include any focused energy source operating in a power range and travel speed for depositing the atomized powder material. In some embodiments, the step of melting the powder material includes selectively laser melting the powder material. In one embodiment, the power range of the focused energy source in the DMLM process includes, but is not limited to, between about 100 watts and about 3,000 watts. In some embodiments, the power range is between about 200 watts and about 2,500 watts, and in some embodiments, between about 300 watts and about 2,000 watts, or any combination, sub-combination, range, or sub-range thereof. In another embodiment, the travel speed includes, but is not limited to, up to 300 mm/sec, for example between about 1 mm/sec and about 300 mm/sec. In some embodiments, the travel speed is between 4 mm/sec and 250 mm/sec, or any combination, sub-combination, range, or sub-range thereof. For example, in a further embodiment, the focused energy source operates in the power range of between about 300 watts and about 2,000 watts, at the travel speed of between about 4 mm/sec and about 250 mm/sec. In another embodiment, a deposition rate for standard steels, titanium, and/or nickel alloys includes, for example, up to 1 kg/hour, up to 0.75 kg/hr, up to 0.5 kg/hour, between about 0.1 kg/hour and about 0.5 kg/hour, up to 0.4 kg/hour, up to 0.3 kg/hour, or any combination, sub-combination, range, or sub-range thereof.

In certain embodiments, after selectively melting the plurality of layers, the replacement portion 200 may undergo a post-processing treatment. In some embodiments, the post-processing treatment is performed after forming the replacement portion 200 separately or after in-situ forming the replacement portion 200. In embodiments where the replacement portion 200 is formed separately, the post-processing treatment is performed prior to securing the replacement portion 200 in the cavity 104. The post-processing treatment of the replacement portion 200 formed through the DMLM process includes any suitable post-processing technique, such as, but not limited to, hot isostatic pressing (HIP'ing), solution heat treating (solutionizing), and/or stress relieving. For example, in one embodiment, the replacement portion 200 is hot isostatic pressed (HIP'd) for 3-5 hours at an elevated temperature of between about 1149° C. and about 1260° C. (2100° F. and 2300° F.), and an elevated pressure of between about 68.95 MPa and about 137.9 MPa (10,000 PSI and 20,000 PSI). In a further embodiment, in addition to HIP'ing, the replacement portion 200 may be solution heat treated (solutionized) for 1-2 hours in vacuum at a temperature of between about 1093° C. and about 1205° C. (2000° F. and 2200° F.). It will be recognized by those skilled in the art that HIP'ing temperatures and heat treat temperatures will be highly dependent on the composition of the powder material and the desired properties.

The plurality of layers of the powder material may include similar or substantially similar compositions between layers, differing compositions between layers, gradient compositions within the replacement portion 200, or a combination thereof. For example, gradient compositions within the replacement portion 200 may be formed by varying flow rate and/or powder material compositions during forming by additive manufacturing the replacement portion 200.

In some embodiments, materials of the component 100 including the portion 102 include any suitable material for continuous use in a turbine engine and/or within the hot gas path of the turbine engine. Suitable materials of the component 100 include, but are not limited to, a metal, a ceramic, a metal alloy such as steel, a stainless steel, a tool steel, a superalloy including nickel, cobalt, chrome, titanium, aluminum, or a combination thereof.

In some embodiments, the component 100 may include a metal alloy. In one embodiment, the metal alloy of the component 100 is a cobalt-based alloy including, but not limited to, a composition, by weight, of about 29% chromium (Cr), about 10% nickel (Ni), about 7% tungsten (W), about 1% iron (Fe), about 0.7% Manganese (Mn), about 0.75% Silicon (Si), about 0.25% carbon (C), about 0.01% boron (B), and balance cobalt (Co) (e.g., FSX414); about 20% to about 24% Cr, about 20% to about 24% Ni, about 13% to about 15% W, about 3% Fe, about 1.25% manganese (Mn), about 0.2% to about 0.5% silicon (Si), about 0.015% B, about 0.05% to about 0.15% C, about 0.02% to about 0.12% lanthanum (La), and balance Co (e.g., HAYNES® 188); about 22.5% to about 24.25% Cr, about 9% to about 11% Ni, about 6.5% to about 7.5% W, about 3% to about 4% Ta, up to about 0.3% titanium (Ti) (e.g., about 0.15% to about 0.3% Ti), up to about 0.65% C (e.g., about 0.55% to about 0.65% C), up to about 0.55% zirconium (Zr) (e.g., about 0.45% to about 0.55% Zr), and balance Co (e.g., Mar-M-509); about 20% Ni, about 20% Cr, about 7.5% Ta, about 0.1% Zr, about 0.05% C, and balance Co (e.g., Mar-M-918).

In another embodiment, the metal alloy of the component 100 is a nickel-based alloy including, but not limited to, a composition, by weight, of about 9.75% Cr, about 7.5% Co, about 6.0% W, about 4.2% aluminum (Al), about 3.5% Ti, about 1.5% molybdenum (Mo), about 4.8% Ta, about 0.5% niobium (Nb), about 0.15% hafnium (Hf), about 0.05% C, about 0.004% B, and a balance of Ni (e.g., René N4); about 7.5% Co, about 7.0% Cr, about 6.5% Ta, about 6.2% Al, about 5.0% W, about 3.0% rhenium (Re), about 1.5% Mo, about 0.15% Hf, about 0.05% C, about 0.004% B, about 0.01% yttrium (Y), and a balance of Ni (e.g., René N5); between about 9% and about 10% Co, between about 9.3% and about 9.7% W, between about 8.0% and about 8.7% Cr, between about 5.25% and about 5.75% Al, between about 2.8% and about 3.3% Ta, between about 1.3% and about 1.7% Hf, up to about 0.9% Ti (for example, between about 0.6% and about 0.9%), up to about 0.6% Mo (for example, between about 0.4% and about 0.6%), up to about 0.2% Fe, up to about 0.12% Si, up to about 0.1% Mn, up to about 0.1% copper (Cu), up to about 0.1% C (for example, between about 0.07% and about 0.1%), up to about 0.1% Nb, up to about 0.02% Zr (for example, between about 0.005% and about 0.02%), up to about 0.02% B (for example, between about 0.01% and about 0.02%), up to about 0.01% phosphorus (P), up to about 0.004% sulfur (S), and a balance of Ni (e.g., René 108); about 13.70% to about 14.30% Cr, about 9.0% to about 10.0% Co, about 4.7% to about 5.1% Ti, about 3.5% to about 4.1% W, about 2.8% to about 3.2% Al, about 2.4% to about 3.1% Ta, about 1.4% to about 1.7% Mo, 0.35% Fe, 0.3% Si, about 0.15% Nb, about 0.08% to about 0.12% C, about 0.1% Mn, about 0.1% Cu, about 0.04% Zr, about 0.005% to about 0.020% B, about 0.015% P, about 0.005% S, and a balance of Ni (e.g., GTD-111®, available from General Electric Company); about 22.2 to about 22.8% Cr, about 18.5 to about 19.5% Co, about 2.3% Ti, about 1.8 to about 2.2% W, about 1.2% Al, about 1.0% Ta, about 0.8% Nb, about 0.25% Si, about 0.08 to about 0.12% C, about 0.10% Mn, about 0.05% Zr, about 0.008% B, and balance Ni (e.g., GTD-222®, available from General Electric Company); about 9.75% Cr, about 7.5% Co, about 6.0% W, about 4.2% Al, about 4.8% Ta, about 3.5% Ti, about 1.5% Mo, about 0.08% C, about 0.009% Zr, about 0.009% B, and a balance of Ni (e.g., GTD-444®, available from General Electric Company); about 15.70% to about 16.30% Cr, about 8.00% to about 9.00% Co, about 3.20% to about 3.70% Ti, about 3.20% to about 3.70% Al, about 2.40% to about 2.80% W, about 1.50% to about 2.00% Ta, about 1.50% to about 2.00% Mo, about 0.60% to about 1.10% Nb, up to about 0.50% Fe, up to about 0.30% Si, up to about 0.20% Mn, about 0.15% to about 0.20% C, about 0.05% to about 0.15% Zr, up to about 0.015% S, about 0.005% to about 0.015% B, and a balance nickel (e.g., INCONEL® 738); about 9.3% to about 9.7% W, about 9.0% to about 9.5% Co, about 8.0% to about 8.5% Cr, about 5.4% to about 5.7% Al, up to about 0.25% Si, up to about 0.1% Mn, about 0.06% to about 0.09% C, incidental impurities, and a balance Ni (e.g., Mar-M-247).

In a further embodiment, the metal alloy of the component 100 is an iron-based alloy including, but not limited to, a composition, by weight, of about 50% to about 55% nickel and cobalt combined, about 17% to about 21% chromium, about 4.75% to about 5.50% niobium and tantalum combined, about 0.08% carbon, about 0.35% manganese, about 0.35% silicon, about 0.015% phosphorus, about 0.015% sulfur, about 1.0% cobalt, about 0.35% to 0.80% aluminum, about 2.80% to about 3.30% molybdenum, about 0.65% to about 1.15% titanium, about 0.001% to about 0.006% boron, about 0.15% copper, and balance of iron (e.g., INCONEL® 718). Other materials of the existing component 101 include, but are not limited to, a CoCrMo alloy, such as, for example, 70Co-27Cr-3Mo; a ceramic matrix composite (CMC), or a combination thereof.

"INCONEL" is a federally registered trademark of alloys produced by Huntington Alloys Corporation, Hungtington, W. Va. "HAYNES" is a federally registered trademark of alloys produced by Haynes International, Inc., Kokomo, Ind.

In some embodiments, the replacement portion 200 may include a metal alloy. Compositions of the powder material for forming the replacement portion 200 may be same, substantially the same, or different from the metal alloys of the portion 102. For example, in one embodiment, the composition of the powder material includes one or more of the metal alloys discussed above with regard to the component 100. In another embodiment, the composition of the powder material includes a tungsten carbide powder mixed with any one of the compositions discussed above with regard to the component 100. The addition of the tungsten carbide powder to the composition of the component 100 strengthens the replacement portion 200 formed from the resulting powder material. In a further embodiment, the powder material includes a composition, by weight, of about 62% Co, about 29% Cr, about 7% Mo, about 0.88% Si, about 0.82% Mn, about 0.1% C, and a balance incidental impurities, while the existing component 101 includes a composition, by weight, of about 29% chromium (Cr), about 10% nickel (Ni), about 7% tungsten (W), about 1% iron (Fe), about 0.25% carbon (C), about 0.01% boron (B), and balance cobalt (Co) (e.g., FSX414). Depending on the powder material composition used for forming the replacement portion 200, the metal alloy of the replacement portion 200 and the metal alloy of the portion 102 are at least one of the same alloy or a different alloy, as discussed above.

As noted previously, typically, the surface properties such as surface roughness may depend on a manufacturing process used to form a component. Inventors of the present disclosure have observed that use of additive manufacturing enables to vary the surface roughness within a cooling hole of a component during forming the component. By optimizing various parameters of the additive manufacturing process for example, DMLM process, the surface roughness may be varied. Therefore, embodiments of the present disclosure provide control on the surface roughness of a cooling hole of the plurality of cooling holes of the replacement portion during the forming by additive manufacturing the replacement portion. The benefits of the ability to vary the surface roughness of the cooling hole arising from the use of additive manufacturing for forming the replacement portion may also enable to achieve a desired flow rate of a cooling fluid in the cooling hole by varying a diameter of the cooling hole.

In an example, by increasing surface roughness of cooling holes, the flow rate of a cooling fluid (for example, air) reduces within the cooling holes, but a heat transfer coefficient increases. Due to reduced flow rate and increased heat transfer coefficient, the net heat pick up by the cooling fluid during or after passing through the cooling holes increases and there would be rise in the temperature of the cooling fluid coming out from the cooling holes. Table 1 shows improved heat transfer parameters for coupon 2 (that had cooling holes of a surface roughness about 7 microns) as compared to coupon 1 (that had cooling holes of a surface roughness about 4 microns). Details of these data are described in the example section below. By maintaining an optimum flow rate of the cooling fluid within at least one cooling hole and the net heat pick up by the cooling fluid, the diameter of the at least one cooling hole can be increased to provide increased area of the at least one cooling hole. Thus, the surface roughness and the diameter of the at least one cooling hole 208 of the replacement portion 200 can be increased as compared to that of the originally presented plurality of cooling holes of the portion 102 to enhance the overall cooling capability and performance (referring FIGS. 1 and 2). Accordingly, the flow rate of the cooling fluid can be controlled or tailored by adjusting the surface roughness and the diameter of the at least one cooling hole 208 of the replacement portion 200 during the forming by additive manufacturing the replacement portion 200 depending on the end use application and/or the desired cooling performance.

Referring to FIGS. 1 and 2 again, in some embodiments, the method includes varying a surface roughness and a diameter of at least one cooling hole 208 of the plurality of cooling holes 208 during the forming by additive manufacturing the replacement portion 200. The varying the surface roughness and the diameter may include increasing or decreasing the surface roughness and increasing or decreasing the diameter of the at least one cooling hole 208 of the replacement portion 200 relative to, respectively, the surface roughness and the diameter of the originally presented plurality of cooling holes of the portion 102 (discussed previously). In some embodiments, the method includes increasing both the surface roughness and the diameter of the at least one cooling hole 208 of the replacement portion 200 relative to, respectively, the surface roughness and the diameter of the originally presented plurality of cooling holes of the portion 102. In some embodiments, the method includes decreasing both the surface roughness and the diameter of the at least one cooling hole 208 of the replacement portion 200 relative to, respectively, the surface roughness and the diameter of the originally presented plurality of cooling holes of the portion 102. In some embodiments, the method includes increasing the surface roughness and decreasing the diameter of the at least one cooling hole 208 of the replacement portion 200 relative to, respectively, the surface roughness and the diameter of the originally presented plurality of cooling holes of the portion 102. In some embodiments, the method includes decreasing the surface roughness and increasing the diameter of the at least one cooling hole 208 of the replacement portion 200 relative to, respectively, the surface roughness and the diameter of the originally presented plurality of cooling holes of the portion 102.

The terms, as used herein, "increasing the surface roughness" and "decreasing the surface roughness" refer respectively to an increase and a decrease in surface roughness, for example coarseness or unevenness of a surface of the at least one cooling hole 208 of the replacement portion 200 as compared to the surface roughness of the originally presented plurality of cooling holes of the portion 102. This increase or decrease in the surface roughness of the at least one cooling hole 208 of the replacement portion 200 may be achieved by the manufacturing process i.e., an additive manufacturing process, employed to form the replacement portion 200. In certain embodiments, the varying the surface roughness and the diameter includes increasing both the surface roughness and the diameter of the at least one cooling hole 208 of the replacement portion 200 as compared to the surface roughness and the diameter of the originally presented plurality of cooling holes of the portion 102.

The varying step of the method may include varying the surface roughness of the at least one cooling hole 208 of the replacement portion 200 in a range from about 0.1 µm Ra to about 10 µm Ra. In some embodiments, the varying step may include varying the surface roughness of the at least one cooling hole 208 of the replacement portion 200 in a range from about 1 µm Ra to about 9 µm Ra. In certain embodiments, the varying step may include varying the surface roughness of the at least one cooling hole 208 of the replacement portion 200 in a range from about 3 µm Ra to about 8 µm Ra. In certain embodiments, the varying the surface roughness includes increasing the surface roughness of the at least one cooling hole 208 of the replacement portion 200 as compared to a surface roughness of the originally presented plurality of cooling holes of the portion 102.

The varying step may further include varying the diameter of the at least one cooling hole 208 of the replacement portion 200 in a range from about 0.1 mm to about 6 mm. In some embodiments, the varying step may include varying the diameter of the at least one cooling hole 208 of the replacement portion 200 in a range from about 0.2 mm to about 4 mm. In certain embodiments, the varying step may include varying the diameter of the at least one cooling hole 208 in a range from about 0.5 mm to about 3 mm.

In some embodiments, the method further includes securing the replacement portion 200 within the cavity 104 to form the repaired component 110. After forming the replacement portion 200, the securing of the replacement portion 200 in the cavity 104 of the component 100 includes any suitable metal and/or alloy joining process, such as, but not limited to, brazing, welding, diffusion bonding, or a combination thereof. As will be appreciated by those skilled in the art, the process for joining the replacement portion 200 to the component 100 may be selected based upon the compositions of the metal alloys of the component 100 and/or the replacement portion 200.

Additionally or alternatively, in some embodiments, the method for repairing the component 100 includes in-situ forming by additive manufacturing the replacement portion 200 onto the component 100 in the cavity 104 after removing the portion 102. In one embodiment, the method includes removing a portion 102 of the component 100 to form the cavity 104 in the component 100, and then disposing the material on the component 100 in the cavity 104 for forming by additive manufacturing the replacement portion 200 in the cavity 104 and thereby forming the repaired component 110. The material disposed onto the component 100 in the cavity 104 through additive manufacturing may include any suitable desired shape and/or geometry. For example, the material disposed directly onto the component 100 may form the replacement portion 200, for example a trailing edge portion having the segment of the internal cavity 203, the shaped outer surface 205, and the plurality of cooling holes 208 formed therein (FIG. 2). The material disposed directly to the component 100 includes any of the materials described above for forming the replacement portion 200.

EXAMPLES

The following example illustrates methods, materials and results, in accordance with a specific embodiment, and as such should not be construed as imposing limitations upon the claims.

Two coupons were formed using a standard, proprietary metal alloy. These coupons had multiple cooling holes, each cooling hole having a diameter 0.06 inches (~1.52 millimeters). Coupon 1 was manufactured using a standard, proprietary machining method and coupon 2 was manufactured using DMLM process. Dimensions of the cooling holes were measured by Nikon Eclipse, MA200, using a Clemex image analysis software. Five sets of readings were taken in at least 5 different cooling holes to compute an average diameter (0.06 inches).

Roughness measurements were carried out inside the cooling holes of coupons 1 and 2 using a Carl Zeiss Surfcom Flex 80A (10 mm traverse distance and 2 µm tip radius). Five sets of readings were taken in at least 5 different cooling holes to compute an average surface roughness. Measurements were taken before and after glass bead blasting on the surfaces of the as-build coupons 1 and 2. An average surface roughness inside the cooling holes of coupon 1 was about 4 µm Ra and an average surface roughness inside the cooling holes of coupon 2 was about 7 µm Ra. Heat transfer calculations were carried out using the dimension i.e., diameter of cooling holes and the measured average surface roughness values for coupons 1 and 2. Numerical simulations were performed using Computational Fluid Dynamics (CFD) to calculate heat transfer parameters such as the flow rate of air through the cooling hole, change in temperature of air before entering and after passing through the cooling hole ($\Delta T$), heat transfer coefficient (HTC) for coupons 1 and 2.

Table 1 shows surface roughness values inside the cooling holes for coupons 1 and 2 and corresponding heat transfer parameters for air having Prandtl number (Pr)=0.5 and Pr=0.1 in comparison to that of a Comparative coupon including cooling holes having a standard smooth surface and a diameter 0.06 inches. Referring to Table 1, it was observed that the flow rate of air through the cooling holes was lower; and $\Delta T$ and heat transfer coefficient were higher for coupon 2 (that had cooling holes of a surface roughness about 7 µm Ra) than that of coupon 1 (that had cooling holes of a surface roughness of about 4 µm Ra). By the surface roughness increase of cooling holes in coupon 2 as compared to coupon 1, the net heat pick up was higher in coupon 2 as compared to that of coupon 1 because of increased HTC. Based on this calculation, it was analyzed that by maintaining the flow rate and the net heat pick up, the diameter of the cooling holes can be increased to provide higher area inside cooling holes for improved cooling.

TABLE 1

| Samples | Surface roughness (µm Ra) | Flow rate (lb/sec) | Flow rate relative to standard smooth surface (%) | Change in flow rate relative to standard smooth surface | $\Delta T$ (° F.) | HTC (Btu/sec) |
|---|---|---|---|---|---|---|
| Pr = 0.5 | | | | | | |
| Comparative Coupon | Standard smooth surface | 0.005735 | 100 | 0 | 107.22 | 0.1639 |
| Coupon 1 | ~4 | 0.005445 | 94.94 | 5.06 | 126.19 | 0.1831 |
| Coupon 2 | ~7 | 0.00521 | 90.85 | 9.15 | 139.22 | 0.1933 |
| Pr = 0.1 | | | | | | |
| Comparative Coupon | Standard smooth surface | 0.004753 | 100 | 0 | 112.77 | 0.1429 |
| Coupon 1 | ~4 | 0.004428 | 93.16 | 6.84 | 130.54 | 0.1541 |
| Coupon 2 | ~7 | 0.00422 | 88.79 | 11.21 | 142.57 | 0.1604 |

While only certain features of the disclosure have been illustrated and described herein, many modifications and changes will occur to those skilled in the art. It is, therefore, to be understood that the appended claims are intended to cover all such modifications and changes as fall within the scope of the disclosure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for repairing a component, the method comprising:
    removing a portion originally including a plurality of original cooling holes, of the component to form a cavity;
    forming by additive manufacturing a replacement portion including a plurality of cooling holes, wherein the replacement portion replaces the portion of the component; and
    varying a surface roughness and a diameter of at least one cooling hole of the plurality of cooling holes relative to the plurality of original cooling holes during the forming by additive manufacturing the replacement portion, wherein the forming includes in-situ forming by additive manufacturing the replacement portion in the cavity, wherein the varying step includes varying the surface roughness in a range from 0.1 µm Ra to 10 µm Ra relative to the plurality of original cooling holes.

2. The method of claim 1, wherein the component including a metal alloy.

3. The method of claim 1, wherein the replacement portion has a shape and geometry substantially same to the cavity or the portion.

4. The method of claim 1, wherein the varying step includes increasing the surface roughness of the at least one cooling hole as compared to a surface roughness of the plurality of original cooling holes of the portion.

5. The method of claim 1, wherein the varying step includes varying the surface roughness in a range from 1 µm Ra to 8 µm Ra relative to the plurality of original cooling holes.

6. The method of claim 1, wherein the varying step includes increasing the diameter of the at least one cooling hole as compared to a diameter of the plurality of original plurality of cooling holes of the portion.

7. The method of claim 1, wherein the varying step includes varying the diameter in a range from 0.1 millimeter to 6 millimeters.

8. The method of claim 1, wherein the varying step includes varying the diameter in a range from 0.5 millimeters to 3 millimeters.

9. The method of claim 1, further including securing the replacement portion in the cavity.

10. The method of claim 1, wherein the component includes a turbine component.

11. The method of claim 10, wherein the turbine component includes a nozzle, a blade, a bucket, a vane, a shroud, a combustor, or a combination thereof.

12. A method for repairing a component, comprising:
removing a damaged portion originally including a plurality of original cooling holes, of the component to form a cavity;
forming by additive manufacturing a replacement portion including a plurality of cooling holes in the cavity, wherein the replacement portion replaces the damaged portion of the component; and
varying a surface roughness and a diameter of at least one cooling hole of the plurality of cooling holes relative to the plurality of original cooling holes during the forming by additive manufacturing the replacement portion, wherein the forming includes in-situ forming by additive manufacturing the replacement portion in the cavity, wherein the varying step includes varying the surface roughness in a range from 0.1 μm Ra to 10 μm Ra relative to the plurality of original cooling holes.

13. The method of claim 12, wherein the varying step includes varying the surface roughness in a range from 1 μm Ra to 8 μm Ra relative to the plurality of original cooling holes.

\* \* \* \* \*